Patented Mar. 1, 1932

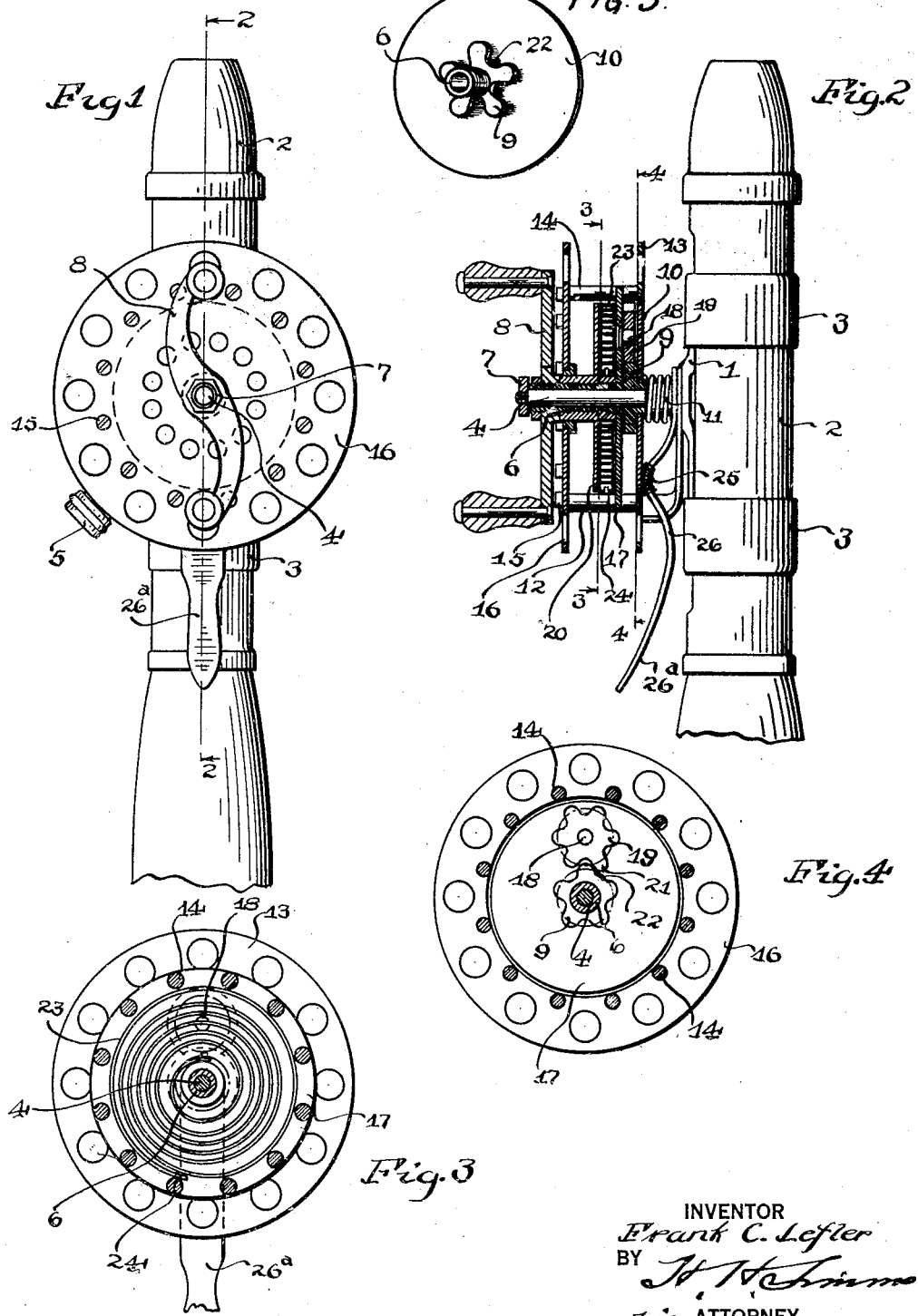

1,847,519

UNITED STATES PATENT OFFICE

FRANK C. LEFLER, OF ROCHESTER, NEW YORK

FISHING REEL

Application filed February 16, 1929. Serial No. 340,406.

This invention relates to fishing reels. An object of this invention is to provide a reel of this kind, in which the spool on which the line is wound, with a resilient unwinding movement independent of the usual winding means. Another object of the invention is to provide such a reel with means for limiting the unwinding movement. Still another object of the invention is the provision of gears or pinions having stop devices for limiting the unwinding movement of the spool.

To these and other ends, the invention consists of certain parts and combinations of parts, all of which will be hereinafter described: the novel features being pointed out in the appended claims.

In the drawings:

Fig. 1 is a front elevation of a fishing reel constructed according to one embodiment of the invention and showing a portion of the rod to which it is attached;

Fig. 2 is a central vertical section of the same on the line 2—2, Fig. 1 and looking in the direction of the arrow;

Fig. 3 is a section on the line 3—3, Fig. 2, looking in the direction of the arrow;

Fig. 4 is a section on the line 4—4, Fig. 2, looking in the direction of the arrow; and Fig. 5 is a detail perspective view of the sleeve carrying the gear and the disk.

Referring more particularly to the drawings, the improved reel comprises a supporting bracket 1 having oppositely arranged flanges by which it may be attached below the handle 2 of a fishing rod by the sliding rings 3 as usual in the art. Rigidly fixed in the bracket 1 and projecting therefrom is a rod or shaft 4 on which the reel and its operating devices are mounted. Also mounted on the bracket 1 is a line guide 5 carried on an arm and arranged conveniently beyond the periphery of the reel.

Revolvably mounted on the shaft 4 is a sleeve 6 retained on the shaft by the nut 7 threaded externally. Secured to the outer end of the sleeve to rotate therewith is a balanced finger piece 8 and at its inner end the gear or pinion 9 is secured thereto and also the disc 10. A spring 11 is coiled about the inner end of the shaft 4 and engages the bracket and the disk 10 and serves to frictionally hold the sleeve to which the disk is connected from free rotation.

Revolvably mounted on the sleeve 6 between the finger piece and the disk 10 is a line spool 12 comprising a ring 13 seated over the periphery of the disk 10 and flush therewith and provided with a plurality of circumferentially arranged projections 14 on which is seated and secured by screws 15 or other suitable means a disk 16. The opposing peripheries of the disk 16 and ring 13 provide opposing flanges between which the line is wound on the intermediate projections 14.

Between the disk 16 and the ring 13 and secured to or embracing the projections 14 is mounted a disk 17. As will be noted this disk is rigidly secured in the spool and moves therewith. Revolvably mounted on a shaft 18 secured to the disk 17 is a pinion or gear 19 meshing with the pinion or gear 9. Mounted between the disks 16 and 17, and secured to the sleeve 6 is a disk 20. It will be noted that this disk, the gear 9 and the disk 10 are arranged to rotate as a unit with the finger piece and the sleeve 6 and the spool and disk 17 may rotate as a unit thereon, the gear 19 having a planetary movement about the center of the gear 9. Means are provided for limiting the rotation of the gears 9 and 19 and hence the movement of the spool relatively to the finger piece. To this end the wheel 19 has a tooth 21 longer than the other teeth but operating freely on the gear 9 until it engages a shallow depression 22 between two teeth of the wheel 9 when further relative movement of the wheels and hence of the reel and finger piece is prevented or stopped, and upon further movement of the finger piece or reel in the same direction turns the other with it as a unit. Relative movement, however, in a reverse direction is possible until the tooth 21 again engages the depression 22 on the wheel 9. In the present instance, the wheel 19 is shown as having six teeth and the wheel 9, five. This permits a relative movement of the reel and finger piece of approximately six revolutions, however, it will be understood that by varying the relative number of teeth in the gears, a greater or lesser relative movement may be provided without departing from the spirit or scope of this invention.

Means are provided for resiliently connecting the finger piece and the spool. Said means comprises a motor or coiled spring 23 secured at its outer end at 24 to one of the projections 14 and at its inner end to the sleeve 6. This spring is sufficiently strong to maintain the stops on the wheels 9 and 19 normally in interengagement in winding position so that the reel immediately turns with the finger piece to wind the line.

The operation is as follows:

Assuming that the line is cast and the parts are in the normal position just described and a fish takes the bait, often it makes a sudden jerk or pull in the water and frees himself from the hook. With the device just described, the sudden pull on the line turns the spool against the action of the spring 23 to unwind a portion of the line, making it impossible for the fish to free itself from the hook. As soon as the tension on the line relaxes, the spring 23 automatically turns the spool to rewind that portion of the line drawn out by the fish. The line, during this operation is continuously held under the tension of the spring, and when the tension on the line is sufficient to overcome the tension of the spring, the spool turns to pay off the line and when the tension of the spring is greater than the tension on the line, it turns the spool to rewind the line. This turning movement under the action of the spring is limited in both directions by the interengagement of the stops 21 and 22 and is more than one complete revolution of the spool.

In order to conveniently hold the finger piece against undue rotation, as when casting the bait, a resilient arm 26 is provided, having a brake shoe 25 adapted to resiliently engage the inside face of the disk 10 and mounted on the bracket 1. The arm is provided with an extension providing a finger piece 26ª by which the arm may be flexed to release the brake.

What I claim as my invention and desire to secure by Letters Patent is:—

1. In a fishing reel, the combination of a spool, means for turning the spool to wind a line thereon, and means permitting a limited unwinding movement of the spool relative to the turning means, said means comprising a pair of gears and stops for limiting the relative movement thereof.

2. In a fishing reel, the combination of a spool adapted to have a line wound thereon, turning means for the spool, resilient means interposed between the spool and the turning means, braking means cooperating with a turning part between the turning means and the resilient means, and a pair of interengaging stops controlled by the relative movement of the spool and turning means for limiting such movement in both directions.

3. In a fishing reel, the combination of winding means, a spool adapted to have a line wound thereon and revolvable independently of the winding means, a stop for limiting the independent movement of the spool in either direction, a spring for turning the spool in one direction adapted to be tensioned by turning the spool in another direction and braking means for the winding means connected thereto at such a point as not to interfere with the turning of the spool by the spring.

4. In a fishing reel, the combination of winding means, a spool adapted to have a line wound thereon and revolvable independently of the winding means, stops for limiting the independent movement of the spool in either direction, a spring for turning the spool in one direction and adapted to be tensioned by turning the spool in another direction and braking means for the winding means connected thereto at such a point as not to interfere with the turning of the spool by the spring.

5. In a fishing reel, the combination of an operating member for winding the line on the reel, resilient means interposed between the line on the reel and the operating member permitting the unwinding of the line independently of the operating member, means for limiting the extent of the unwinding movement and braking means interposed between the operating member and the resilient means.

6. In a fishing reel, a support, a shaft carried by the support, a sleeve loose on the shaft, a spool loose on the sleeve, a coil spring forming yielding connecting means between the spool and sleeve, a gear fixed to the sleeve, a gear carried by the spool and revolvable therewith about the fixed gear, stop means between the two gears to limit the rotation of the spool, means applied to the said sleeve for rotating the spool to wind the line thereon, a disk rotatable with the sleeve, and brake means mounted on the support and engageable with the said disk to prevent undue rotation of the sleeve.

FRANK C. LEFLER.